July 13, 1926.
F. SOLEY
1,592,785
LOCK FOR SPARE TIRES OF AUTOMOBILES
Filed Oct. 20, 1925
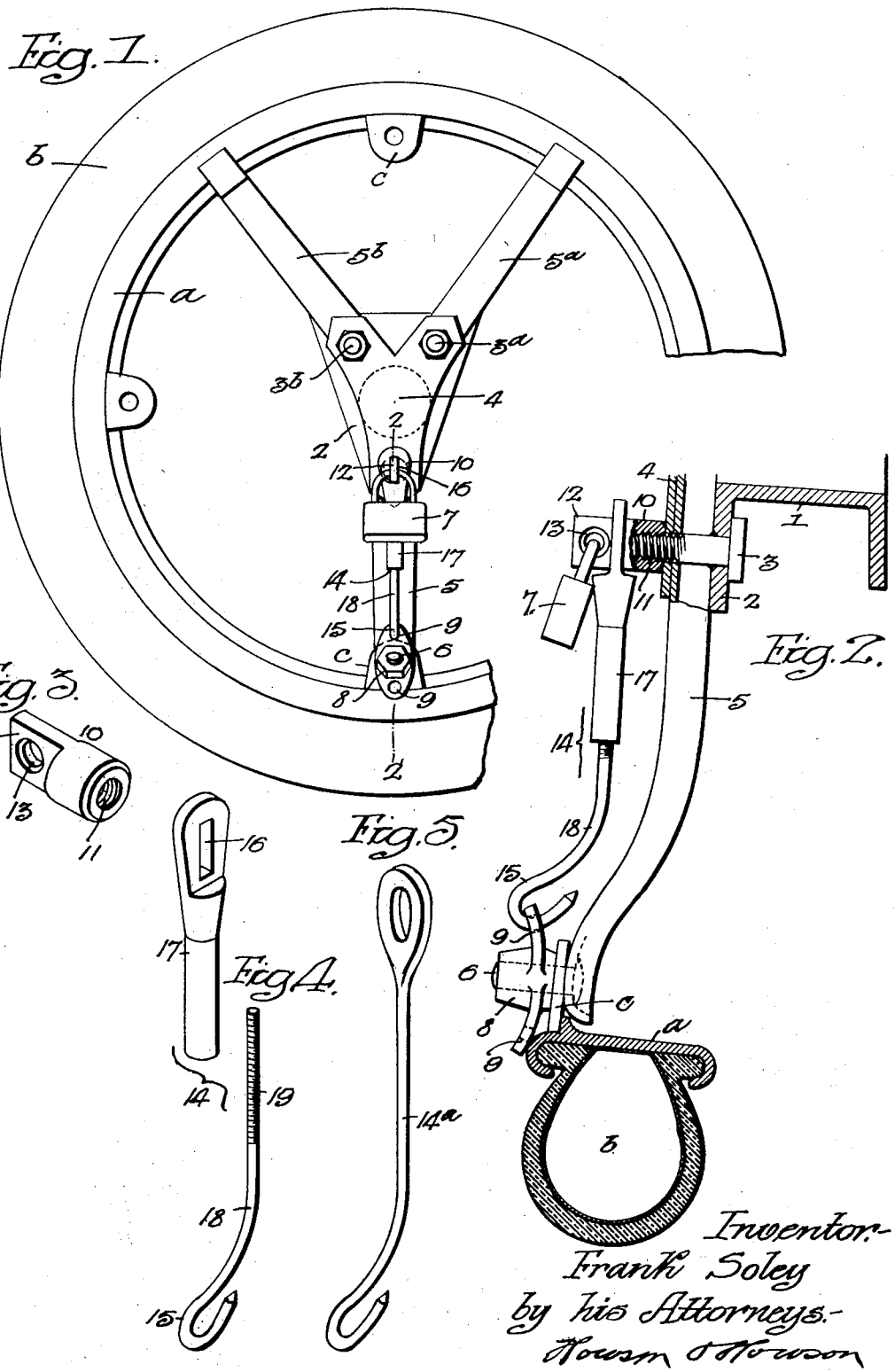
Inventor.-
Frank Soley
by his Attorneys.-
Howson & Howson Patented July 13, 1926.

1,592,785

UNITED STATES PATENT OFFICE.

FRANK SOLEY, OF PHILADELPHIA, PENNSYLVANIA, ASSIGNOR, BY MESNE ASSIGNMENTS, TO THE YALE & TOWNE MANUFACTURING COMPANY, OF STAMFORD, CONNECTICUT, A CORPORATION OF CONNECTICUT.

LOCK FOR SPARE TIRES OF AUTOMOBILES.

Application filed October 20, 1925. Serial No. 63,712.

The object of my invention is to provide a single means for locking a rim of a spare tire to a tire-holding frame, and to lock the frame to the permanent bracket on the automobile.

In the accompanying drawing:

Fig. 1 is a face view of a spare tire holder illustrating the application of my invention, the rim and tire being broken away;

Fig. 2 is an enlarged sectional view on the line 2—2, Fig. 1;

Fig. 3 is a detached perspective view of the locking-nut;

Fig. 4 is a view of the two parts of the hooked locking-bar detached; and

Fig. 5 is a view illustrating a one-piece locking-bar.

The bracket 1, which is designed to be permanently secured to the rear of an automobile, in the present instance has a flange 2, through which extend studs 3, 3ª and 3ᵇ. These studs are welded to the flange 2 of the bracket.

A triangular frame 4 is mounted on the studs of the bracket and is secured in position by nuts mounted on the studs. The frame 4 has arms 5, 5ª and 5ᵇ. The arms 5ª and 5ᵇ are shaped at their outer ends to fit the rim a of a wheel on which is a tire b, and the arm 5 has a stud 6 at its outer end secured thereto by welding. This stud extends through one of the perforated lugs c of the rim and is provided with a wing-nut 8, which holds the parts together. Each wing is perforated at 9.

As the frame is located ordinarily at the back of an automobile, it acts as a bumper, and if it is injured or bent, it must be removed from the bracket for repairs or replacement.

In order to lock the rim to the frame and the frame to the bracket, the standard nut on the stud 3 is removed and a special nut 10 is screwed onto the stud 3. This nut has a threaded opening 11 and a reduced flat portion 12, which is perforated at 13 to receive the shackle of a lock 7.

The wing-nut 8 on the stud 6 is turned so that one of the perforated wings is in line with the nut 10, as in Figs. 1 and 2. A locking-bar 14 is then applied. At one end of the bar is a hook 15, which is passed through the perforation 9 in the wing-nut 8, while the other end, which is slotted at 16, is passed over the reduced flattened portion 12 of the special nut 10, as shown in Fig. 2. Then the shackle of a lock is passed through the perforation 13 in the portion 12 of the nut 10, locking the bar to the nut 10, which prevents the turning of the nut on the stud 3, and as the bar is held by the nut 10, the wing-nut 8 cannot be turned, as it is held by the hooked portion of the bar. Thus the bar holds both nuts from turning, and prevents the removal of the rim from the frame, or the frame from the bracket.

The bar is shown in Figs. 1, 2 and 4 as made in two parts 17 and 18. The hooked part 18 has a threaded portion 19 adapted to a threaded opening in the part 17, so that on turning one part in respect to the other part, the bar can be readily adjusted if found necessary. In some instances the bar 14ª may be made in a single piece, as shown in Fig. 5, where the equipment is standardized.

I claim:

1. The combination in a spare tire holder for automobiles, of a bracket; a frame supporting the rim of a wheel on which a tire is mounted; a screw-stud connecting the frame to the bracket; a nut thereon; a wing-nut clamping the rim to the frame; a hooked bar engaging one of the wings of the nut and engaging the nut on the bracket screw-stud; and a lock attached to the latter nut, holding the bar in place.

2. The combination in a spare tire holder for automobiles, of a bracket; a frame on the bracket having arms supporting the rim of a wheel on which a tire is mounted; a screw-stud secured to the bracket and extending through an opening in the frame; a nut on the screw-thread, having a flattened portion perforated by the reception of the shackle of a padlock; a stud secured to one of the arms of the frame; a wing-nut on the stud, one of the wings being perforated; and a locking-bar having a hook at one end to enter the perforation in the wing-nut, and having a slot at the opposite end to allow it to pass over the flattened portion of the nut securing the frame to the bracket.

3. A locking-bar for securing the parts of a spare tire holder for automobiles, said bar having a hook at one end to engage one part, and having a suitably formed opening at the opposite end to fit over a nut to prevent it from turning.

FRANK SOLEY.